United States Patent
Hagiike (10) Patent No.: US 6,607,461 B2
(45) Date of Patent: *Aug. 19, 2003

(54) ELECTRICALLY DRIVEN ACTUATOR

(75) Inventor: Junji Hagiike, Ota-ku (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/838,292

(22) Filed: Apr. 20, 2001

(65) Prior Publication Data

US 2001/0045783 A1 Nov. 29, 2001

(30) Foreign Application Priority Data

May 25, 2000 (JP) ......................................... 2000-154932

(51) Int. Cl.⁷ ................................................. F16H 3/70
(52) U.S. Cl. ........................ 475/169; 475/163; 475/170; 475/177; 475/181
(58) Field of Search ................................ 475/163, 169, 475/177, 181, 170, 165, 172

(56) References Cited

U.S. PATENT DOCUMENTS

| | | | | |
|---|---|---|---|---|
| 2,482,568 A | * | 9/1949 | Werner | ........................ 475/181 |
| 3,213,711 A | * | 10/1965 | Van Den Kieboom | ...... 475/169 |
| 3,918,326 A | * | 11/1975 | Kida et al. | ................... 475/181 |
| 4,307,630 A | * | 12/1981 | Osborn et al. | .............. 475/169 |
| 4,449,425 A | * | 5/1984 | Carden | ........................ 475/181 |
| 5,083,626 A | * | 1/1992 | Abe et al. | ................... 180/79.1 |
| 5,878,624 A | * | 3/1999 | Showalter et al. | ........ 74/473.37 |

* cited by examiner

Primary Examiner—Sherry Estremsky
Assistant Examiner—Tisha D. Lewis
(74) Attorney, Agent, or Firm—Oliff & Berridge, PLC (57) ABSTRACT

A low-vibration and precise electrically driven actuator is provided. A disk is fixed to an input shaft, and a planetary gear is fixed to an output shaft. A circular recess is formed in the disk so as to be eccentric with respect to the input shaft. A ring gear engaged with the planetary gear is rotatably supported by the circular recess. A weight portion W is provided in an unrecessed portion of the disk in order to recover an axial dynamic balance of the disk, which is lost by arranging the circular recess and the ring gear. Since the planetary gear is coaxially fixed to the output shaft, it does not make an eccentric motion and thus its dynamic balance is secured. Accordingly, the axial dynamic balance can be secured in every individual rotating element composing a gear device. The gear device is employed in the electrically driven actuator for the purpose of providing an electrically driven actuator with a low vibration and a property of high precision.

11 Claims, 8 Drawing Sheets

ELECTRICALLY DRIVEN ACTUATOR

BACKGROUND OF THE INVENTION

1. Field of the Invention

The present invention relates to a technology for reducing the vibrations of an electrically driven actuator.

2. Description of the Related Art

For an actuator which transmits the output of a motor through a gear device to a threaded shaft and which sets up a linear motion in a member engaged with the threaded shaft, it is preferable, in view of facilitating miniaturization, to use a gear device in which an input and an output shaft have coincident axes. As a gear device of this type, a planetary gear mechanism is widely known in the prior art. The planetary gear mechanism in general consists of three elements, i.e., a sun gear, a planetary gear and a carrier. The sun gear includes an external gear and/or an internal gear (a ring gear). The planetary gear mechanism is classified into various types according to the combination of these three elements.

Figure 7:
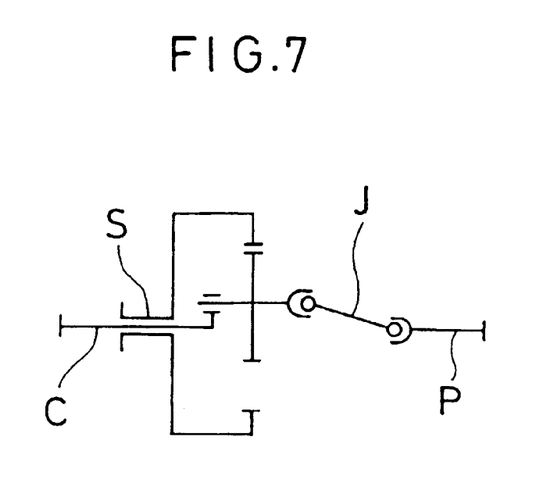
FIG. 7 is a schematic view of an S-P-C type planetary gear mechanism which is applied to a related electrically driven actuator.

FIG. 7 shows a gear device called an S-P-C type planetary gear mechanism. In FIG. 7, reference symbol S designates a shaft of a sun gear, P designates a shaft of a planetary gear, and C designates a shaft of a carrier. These shafts are arranged as a basic structure. In an example shown in FIG. 7, the shaft C of the carrier serves as an input shaft, and the shaft P of the planetary gear serves as an output shaft. The shaft C of the carrier eccentrically supports the planetary gear and makes it rotatable. The planetary gear makes rotating and revolving motions by engaging with the fixed sun gear (the ring gear). The shaft P of the planetary gear is provided with a universal joint J or a linking element equivalent thereto so as to pick up only the revolving motion as an output.

The S-P-C type planetary gear mechanism is highly useful in various fields since a relatively large speed reduction ratio (30:1) is attainable in said mechanism by means of only two gears (the ring gear and the planetary gear) in a state wherein the input shaft is arranged coaxially to the output shaft. In addition, a so-called harmonic drive is a gear device classified as an S-P-C type planetary gear mechanism.

Figure 8A:
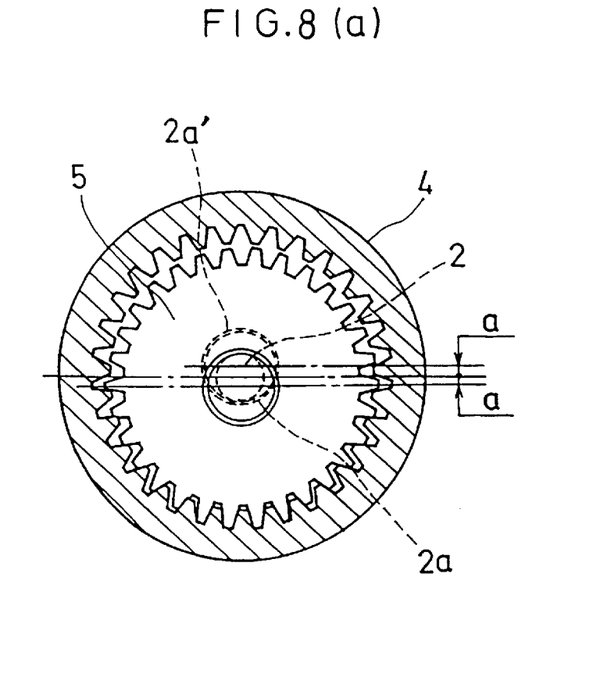
FIG. 8(a) is a sectional view taken along a line A—A of FIG. 8(b).
Figure 8B:
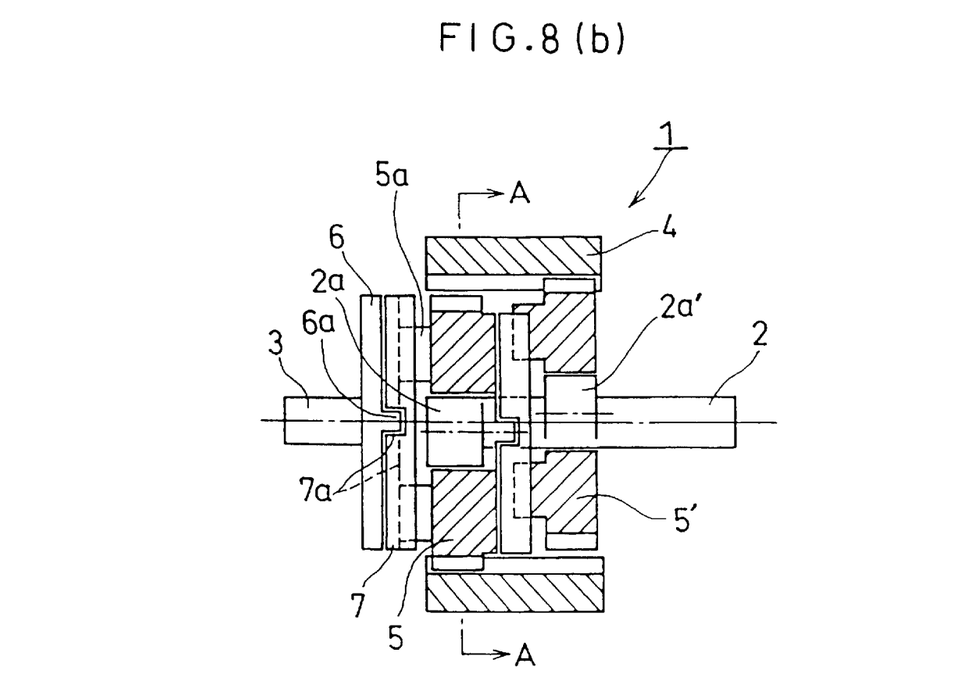
FIG. 8(b) is a sectional view of a major portion of the gear device.

For the S-P-C planetary gear mechanism of this type, it is essential to suppress the vibrations generated by an eccentric motion of the planetary gear. FIG. 8 shows a conventional S-P-C type gear device constructed for the purpose of suppressing the generation of the vibrations.

A gear device 1 is designed such that a fixed ring gear 4 and planetary gears 5 and 5' which make the rotating and revolving motions are disposed between an input shaft 2 and an output shaft 3, to thereby perform a speed reduction of one step. The input shaft 2 is provided with eccentric portions 2a and 2a', where the planetary gears 5 and 5' are supported on the shaft 2 eccentrically. As shown in FIG. 8(a), if the eccentric portion 2a is arranged eccentric with the axis of the input shaft 2 by a distance a, correspondingly the eccentric portion 2a' is also arranged to be eccentric therewith by the distance a. Hereby, the planetary gears 5 and 5' counteract each other's vibration when they make the rotating and revolving motions in engagement with the ring gear 4.

As a linking element corresponding to the universal joint J shown in FIG. 7, a coupling plate 7 is disposed between a flange 6 fixed to the output shaft 3 and the planetary gear 5, and key slots 7a are provided on both sides of the coupling plate 7 so as to interact perpendicularly. A key 6a provided on the flange 6 and a key 5a provided on the planetary gear 5 are slidably engaged respectively with the key slots 7a on both sides so as to constitute a universal joint. Although not illustrated, the linking element which transmits the rotating motion of the planetary gear 5' to the output shaft 3 can be constructed by the same mechanism.

In the gear device 1 shown in FIG. 8, when the planetary gear 5 makes the rotating and revolving motions while being engaged with the ring gear 4, the planetary gear 5 and the planetary gear 5' function as balancers mutually. Thereby, the planetary gear 5 and planetary gear 5' counteract each other's vibration.

However, the planetary gears 5 and 5' are disposed to be offset from each other in the axial direction (i.e., the axial direction of axes of the input and output shafts 2 and 3). Therefore, the gear device shown in FIG. 8 secures a static balance among the rotating elements, but does not secure an axial dynamic balance among the rotating elements. Accordingly, in a case the gear device 1 shown in FIG. 8 is required to be driven at a high speed or to be operated precisely, there has sometimes arisen an adverse effect due to the vibrations caused by the axial dynamic imbalance among the rotating elements.

SUMMARY OF THE INVENTION

The present invention was made in order to solve the above-mentioned problem, and an object thereof is to provide an electrically driven actuator equipped with a gear device which can improve an axial dynamic balance in a so-called S-P-C type planetary gear mechanism and which can suppress the generation of the vibrations under various use conditions. Another object of the present invention is to provide a highly precise and low-cost electrically driven actuator by simplifying the structural complication of the gear device and by providing a high-precision gear device at a low cost.

The electrically driven actuator according to a first aspect of the present invention for solving the foregoing issue is characterized by a gear device which performs a speed reduction of one step using two gears disposed between an input shaft and an output shaft coaxially arranged, and which secures an axial dynamic balance in every individual rotating element in the electrically driven actuator which transmits the output of a motor through the gear device to a threaded shaft, and which generates a linear motion in a member engaged with the threaded shaft.

In the present invention, the axial dynamic balance in the gear device as a whole in the electrically driven actuator is secured by keeping an axial dynamic balance in every individual rotating element which composes the gear device.

In the electrically driven actuator according to a second aspect of the present invention, the rotating elements include a disk which has a circular recess arranged to be eccentric with respect to the input shaft and which is fixed to the input shaft, a ring gear which is rotatably supported by the circular recess and whose rotating motion is restricted to an eccentric motion in the circular recess when the disk rotates, and a planetary gear which is fixed coaxially to the output shaft and engaged with the ring gear. The disk is provided with a weight portion for recovering the axial dynamic balance which is lost by arranging the circular recess and the ring gear.

In this arrangement, the weight portion recovers the axial dynamic balance which is lost by arranging the circular recess and the ring gear. Since the planetary gear is fixed coaxially to the output shaft, it does not make the eccentric motion and thus secures the dynamic balance thereof. Accordingly, the axial dynamic balance is secured in every individual rotating element.

In the electrically driven actuator according to a third aspect of the present invention, the weight portion includes thickness-reduced portions which are formed in an unrecessed portion of the disk, and which have the same depth as that of the recess. According to the present invention, since the weight portion is formed in the disk per se, it is unnecessary to add a new element onto the disk for keeping an axial balance of the disk. Secured by setting the depth of the thickness-reduced portions to be identical with that of the recess is the axial dynamic balance which is lost due to the circular recess on the disk.

In the electrically driven actuator according to a fourth aspect of the present invention, the thickness-reduced portions are a plurality of circular holes having the same diameter. By providing a plurality of circular holes having the same diameter as thickness-reduced portions, the manufacturing process for forming the thickness-reduced portions is reduced.

In the electrically driven actuator according to a fifth aspect of the present invention, the thickness-reduced portions include a plurality of circular holes whose diameters are gradually varied. By providing a plurality of circular holes having different diameters as thickness-reduced portions, more ideal balance can be attained.

In the electrically driven actuator according to a sixth aspect of the present invention, the disk is formed axially dividable so as to increase the degree of freedom in selecting materials for respective portions of the disk. Furthermore, the circular recess and the thickness-reduced portions are easily formed equal in depth by providing a half of the dividably formed disk with the circular recess and the thickness-reduced portions before it is combined with the other half.

In the electrically driven actuator according to a seventh aspect of the present invention, rotating elements include a planetary gear which is axis-supported by an eccentric portion provided on the input shaft, and which makes a rotating motion and a revolving motion, and the planetary gear is provided with a cavity portion within which the weight portion is provided to recover a balance of the planetary gear.

In this structure, by providing the cavity portion in the planetary gear and by locating the weight portion within the cavity portion, the balance is recovered within the planetary gear which is axis-supported by the eccentric portion of the input shaft to make the eccentric motion. That is, by securing the axial dynamic balance of the planetary gear per se, the axial dynamic balance is secured for the entire gear device.

In the electrically driven actuator according to an eighth aspect of the present invention, the weight portion is fixed to the eccentric portion of the input shaft so that the eccentric motion of the center of gravity of the weight portion is in the phase opposite to the eccentric motion of the center of gravity of the planetary gear. According to this structure, the center of gravity of the planetary gear and that of the weight portion are constantly in the position wherein they have an even balance with each other, and therefore it is possible to secure the axial dynamic balance of the planetary gear which is the rotating element of the gear device.

The electrically driven actuator according to a ninth aspect of the present invention has a means for releasing restriction of the rotating motion of the ring gear with respect to a casing. This structure makes it possible to fix the ring gear to the casing or rotate the ring gear freely as required.

BRIEF DESCRIPTION OF THE DRAWINGS

FIG. 1 shows a gear device of an electrically driven actuator according to the embodiment of the present invention.

FIG. 6 shows an application example of the gear device according to the embodiment of the present invention.

FIG. 8 shows a gear device applied to a related electrically driven actuator.

DETAILED DESCRIPTION OF THE PREFERRED EMBODIMENTS

Hereafter, the embodiments of the present invention will be described with reference to the attached drawings. Note that the portions equal to or corresponding to those in the related art are denoted by the same reference numerals, and the detail thereof is omitted.

Figure 1A:
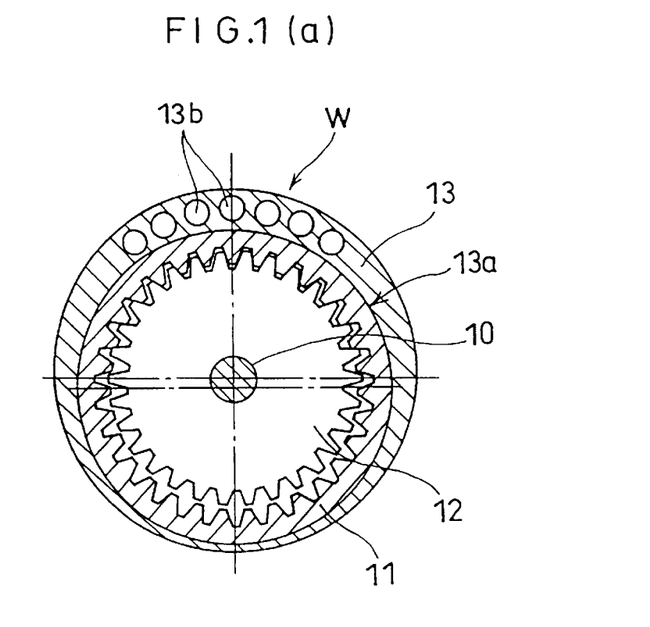
FIG. 1(a) is a sectional view taken along a line B—B of FIG. 1(b).
Figure 1B:
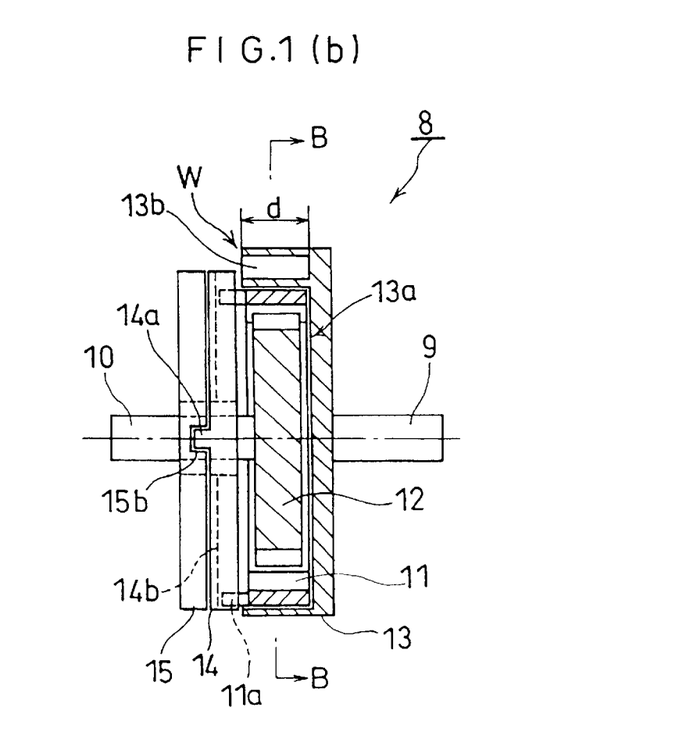
FIG. 1(b) is a sectional view of a major portion of the gear device.

FIG. 1 shows a gear device 8 of an electrically driven actuator (see FIG. 2) according to an embodiment of the present invention. FIG. 1(b) is a sectional view of a major portion of the gear device 8, and FIG. 1(a) is a sectional view taken along a line B—B of FIG. 1(b).

The gear device 8 is designed such that two gears, i.e., a ring gear 11 and a planetary gear 12, are disposed between an input shaft 9 and an output shaft 10 arranged coaxial with each other, thereby performing a speed reduction of one step. A disk 13 is fixed to the input shaft 9, whereas the planetary gear 12 is fixed to the output shaft 10.

A circular recess 13a is formed in the disk 13 in an eccentric manner with respect to the input shaft 9. The ring gear 11 engaged with the planetary gear 12 is rotatably supported by the circular recess 13a.

Furthermore, thickness-reduced portions 13b having a depth d which is the same depth as that of the recess 13a are formed in a portion of the disk 13 where the recess 13a is not provided. The thickness-reduced portions 13b, which have the depth d which is the same depth as that of the recess 13a in a portion of the disk 13 where the recess 13a is not provided, form a weight portion W for recovering the axial dynamic balance of the disk 13, which is lost by arranging the recess 13a and the ring gear 11 in the disk 13.

The thickness-reduced portions 13b are formed in the shape of a plurality of circular holes having the same diameter as shown in FIG. 1(a), but the thickness-reduced portions 13b may be designed to have diameters determined to be smaller as they are located farther from a center toward lateral ends. Instead of a plurality of holes, a partial cut in the peripheral edge of the disk 13 may be provided. Moreover, it is not essential that the disk 13 has an integral structure, and for example, it may be axially divided at the depth d in FIG. 1.

The gear device 8 is provided with two plates 14 and 15 located axially adjacent to the ring gear 11. The two plates 14 and 15 have central portions into which the output shaft 10 is inserted. The plate 15 is fixed to a casing (not shown) of the gear device so that the rotation thereof is restricted. The plate 15 is provided with a key slot 15b. The key slot 15b is slidably coupled with a key 14a provided on the plate 14. The opposite surface of the plate 14 to the ring gear 11 is provided with a key slot 14b in a perpendicular direction to the key 14a. A key 11a provided on the ring gear 11 is slidably coupled with the key slot 14b. Not only the above described structure but some other structure may be applied to the construction of a linking element corresponding to a universal joint J shown in FIG. 7.

With the above structure, the plates 14 and 15 restrict a rotating motion of the ring gear 11. When the disk 13 is rotated integrally with the input shaft 9, the ring gear 11 makes only an eccentric motion within the recess 13a of the disk 13. The ring gear 11 which makes only the eccentric motion is engaged with the planetary gear 12 fixed coaxially to the output shaft 10. The engagement of the ring gear 11 and the planetary gear 12, caused by the eccentric motion of the ring gear 11, rotates the planetary gear 12 and drives the output shaft 10.

The gear device 8 constructed as described above provides the following functional effects. In the disk 13 of the gear device 8, the weight portion W is formed to recover an axial dynamic balance of the disk 13, which is lost by eccentrically arranging the circular recess 13a and the ring gear 11. Furthermore, since the planetary gear 12 engaged with the ring gear 11 is fixed coaxially to the output shaft 10, the planetary gear 12 does not make the eccentric motion, and the dynamic balance thereof is secured. Accordingly, it is possible to secure the axial dynamic balance in every individual rotating element which composes the gear device 8.

Since the weight portion W is formed by the disk 13 per se, it is unnecessary to add a new element onto the disk 13 for attaining an axial balance of the disk 13. Therefore, the gear device is not complicated in structure. Moreover, by setting the depth of the thickness-reduced portions 13b to be the depth d which is the same depth as the circular recess 13a, the dynamic balance which may otherwise be lost by arranging the circular recess 13a in the disk 13 can be secured.

Furthermore, if the thickness-reduced portions 13b are formed in the shape of a plurality of circular holes having the same diameter, a common tool or a common machining program can be used to process all of the thickness-reduced portions 13b. Accordingly, it is possible to reduce the machining process of the thickness-reduced portions 13b. If the thickness-reduced portions 13b are formed in the shape of a plurality of holes whose diameters are gradually varied, it is possible to attain more ideal balance.

Structuring the disk 13 to be axially dividable increases the degree of freedom in selecting material for each part of the disk; thereby, it is possible to promote the lightweight, high rigidity, simplification of the process, low cost, etc., as required. If one of the members axially divided in a given thickness is processed to have the circular recess 13a and the thickness-reduced portions 13b before it is integrated with the other axially divided member, it is easy to form the circular recess 13a and the depth d of the thickness-reduced portions 13b so as to have an equal depth.

According to the gear device of the embodiment of the present invention, it is possible to provide a gear device which can improve the dynamic balance in a so-called S-P-C type planetary gear mechanism, and suppress the generation of the vibrations under various use conditions. It is also possible to overcome the complication in structure of the gear device, and provide the high-precision gear device at a low cost.

Here, the electrically driven actuator according to the embodiment of the present invention will be described with reference to FIGS. 2 to 5.

Figure 2:
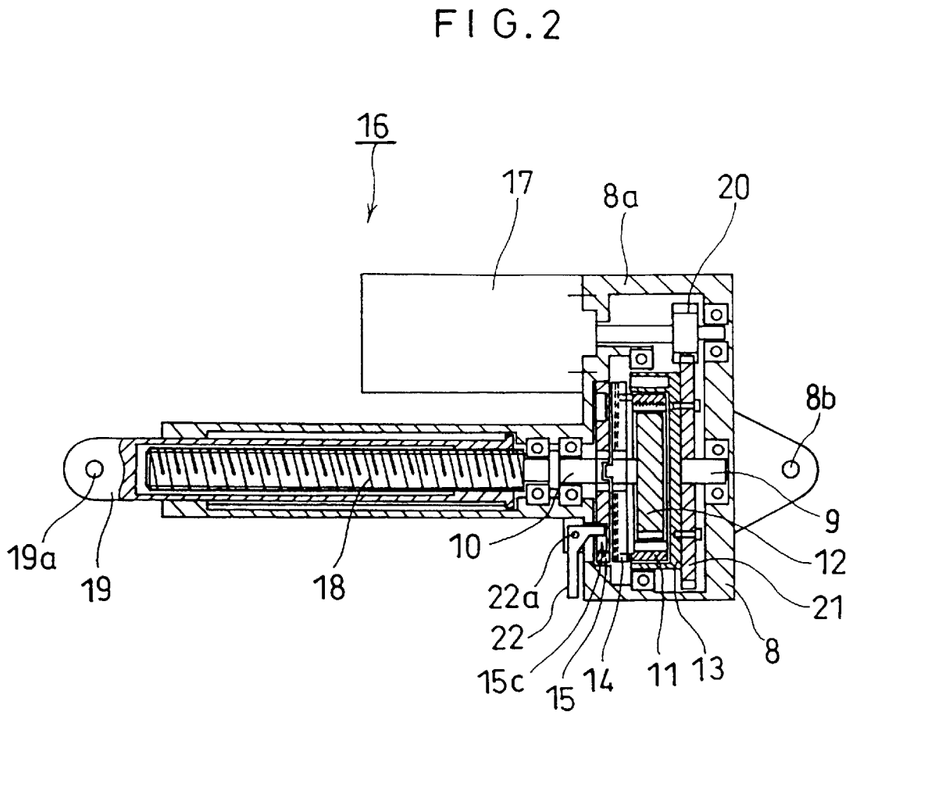
FIG. 2 is a sectional view of a major portion of the electrically driven actuator according to the embodiment of the present invention.

An electrically driven actuator 16 shown in FIG. 2 transmits the output of the motor 17 through the gear device 8 shown in FIG. 1 to a threaded shaft 18 (a trapezoidal threaded shaft), and generates an axial linear motion of a plunger 19 engaged with the threaded shaft 18. The motor 17 is fixed to a casing 8a of the gear device 8. A gear 20 (a spur gear) is fixed to the output shaft of the motor, and a gear 21 engaged with the gear 20 is fixed to the disk 13 of the gear device. Furthermore, the output shaft 10 of the gear device is fixed to the threaded shaft 18.

The casing 8a is provided with a stopper 22. By coupling the stopper 22 with a key slot 15c formed in the plate 15, the plates 14 and 15 for restricting a rotating motion of the ring gear 11 are fixed in a position with respect to the casing 8a. By rotating the stopper 22 about a pivot 22a clockwise in FIG. 2 to disengage a leading end portion of the substantially L-shaped stopper 22 from the key slot 15c, the plates 14 and 15 and the ring gear 11 can be freely rotated with respect to the casing 8a. Reference numerals 8b and 19a respectively designate pivot holes formed in the casing 8a and the plunger 19, which are used for connecting driven members (e.g. a robot arm) of the electrically driven actuator 16.

According to the electrically driven actuator 16 in the present invention, a large driving force can be obtained by means of a motor with a small output, since the number of revolutions of the motor 17 is decreased by the gear device 8, and thereafter transmitted to the threaded shaft 18. The electrically driven actuator 16 possesses the advantageous features of the gear device 8 as they are, so that it is possible to suppress the generation of the vibrations. In addition, since the gear device 8 is precise and low cost, the electrically driven actuator is also highly precise and low cost.

Furthermore, a key slot 15c in the plate 15 and the stopper 22 are provided for releasing the restriction on the rotating motion of the ring gear 11 with respect to the casing 8a, and the engagement and disengagement between them can be freely performed from the exterior of the casing 8a. Therefore, it is possible to perform an operation bypassing the electrically driven actuator 16 as required. The detail is omitted here as to other functional effects of the gear device 8 used in the electrically driven actuator 16.

Figure 3:
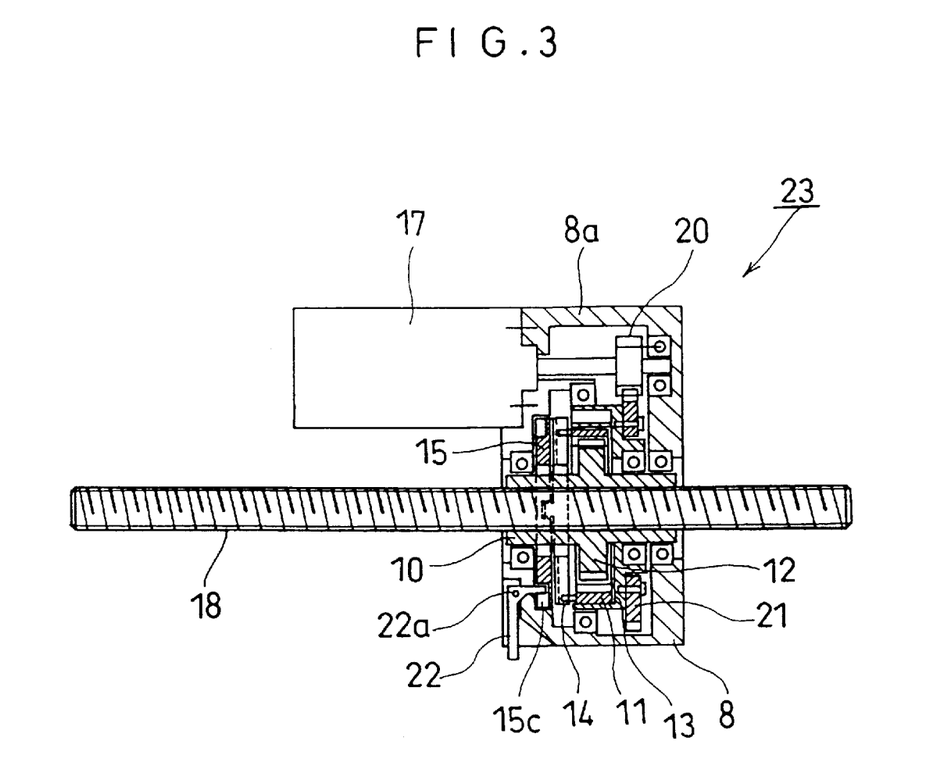
FIG. 3 is a sectional view of a major portion of an application example of the electrically driven actuator according to the embodiment of the present invention.

An electrically driven actuator 23 shown in FIG. 3 has substantially the same structure as that of the electrically driven actuator 16 shown in FIG. 2, but is different therefrom in that the output shaft 10 is formed as a hollow shaft, and that a threaded groove engaged with the threaded shaft 18 is formed on an inner wall of the hollow shaft. Accordingly, the threaded shaft 18 penetrates through the gear device 8, and is freely movable in the axial direction.

The structure wherein the output shaft 10 is formed as the hollow shaft can be readily put into practice on condition that a structure wherein the planetary gear 12 per se does not make the eccentric motion is employed in the gear device 8 and that the output shaft 10 is given a diameter large enough to penetrate the threaded shaft 18. The detail is omitted here as to other functional effects similar to those of the electrically driven actuator 16 shown in FIG. 2.

Figure 4:
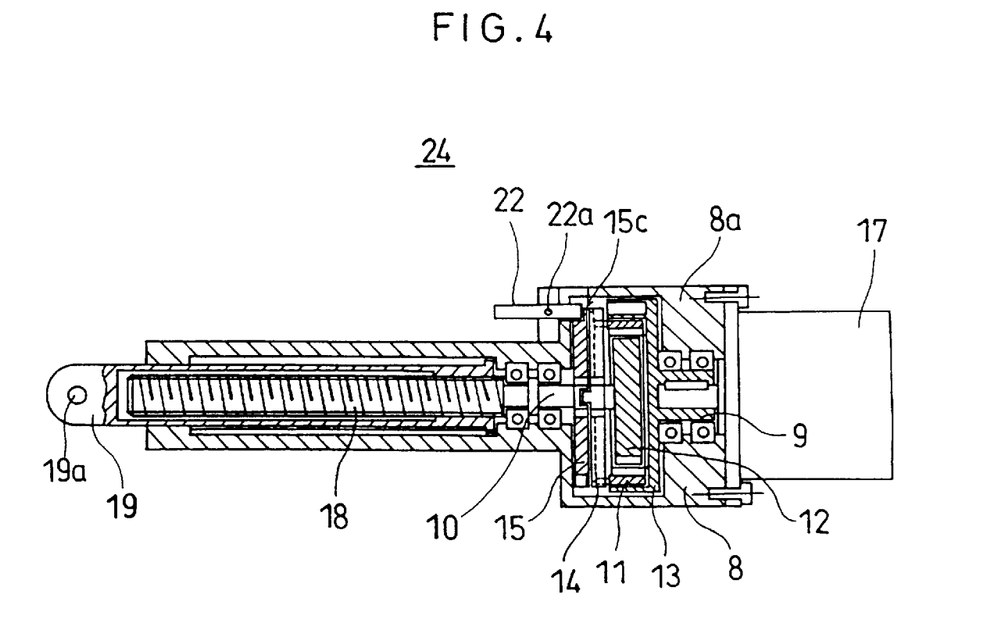
FIG. 4 is a sectional view of a major portion of another application example of the electrically driven actuator according to the present invention.
Figure 5:
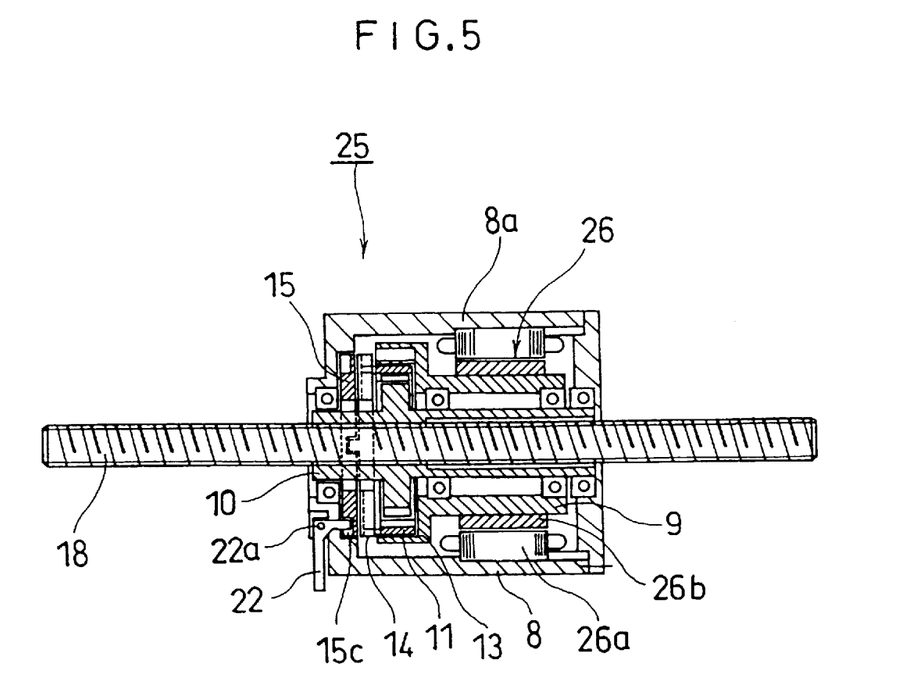
FIG. 5 is a sectional view of a major portion of yet another application example of the electrically driven actuator according to the embodiment of the present invention.

An electrically driven actuator 24 shown in FIG. 4 is another application example based on the electrically driven actuator 16 shown in FIG. 2. The output shaft of the motor 17 is directly coupled with the input shaft 9 of the gear device 8, so that the input shaft 9 and the output shaft 10 of the gear device 8, the motor 17 and the threaded shaft 18 are all coaxially arranged. An electrically driven actuator 25 shown in FIG. 5 is an application example based on the electrically driven actuator 23 shown in FIG. 3. In the electrically driven actuator 25, the input shaft 9 and the output shaft 10 of the gear device 8, the threaded shaft 18 and a hollow motor 26 are all coaxially arranged by integrally providing the hollow motor 26 within the casing 8*a* of the gear device 8. In addition, a coil of the hollow motor 26 and a magnet fixed to the input shaft 9 are respectively designated by reference numerals 26*a* and 26*b*.

The electrically driven actuator 24 shown in FIG. 4 and the electrically driven actuator 25 shown in FIG. 5 are facilitated in miniaturization by arranging all structuring elements coaxially. The detail is omitted here as to the functional effects similar to those of the electrically driven actuators 16 and 23.

Figure 6A:
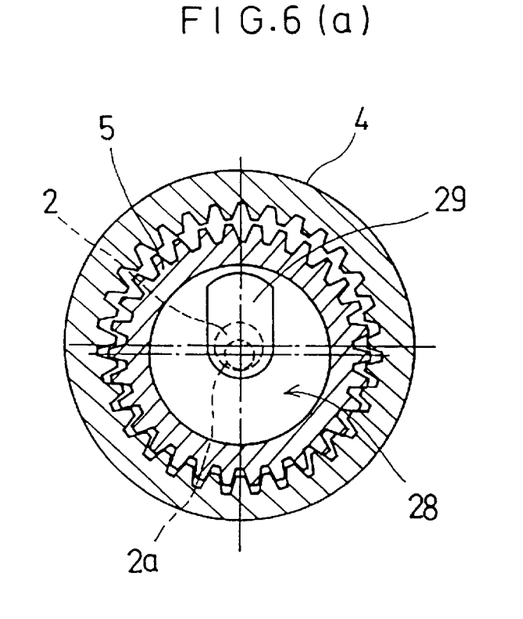
FIG. 6(a) is a sectional view taken along a line C—C of FIG. 6(b).
Figure 6B:
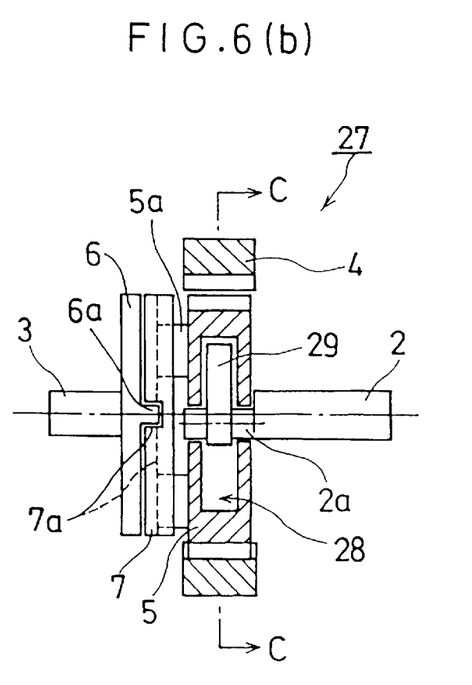
FIG. 6(b) is a sectional view of a major portion of the gear device.

FIG. 6 shows a gear device 27 which is applicable in the electrically driven actuators according to the present invention. Note that FIG. 6(*b*) is a sectional view of a major portion of the gear device 27, and FIG. 6(*a*) is a sectional view taken along a line C—C of FIG. 6(*b*). Here, those portions equal to or corresponding to the portions in the related art or the gear device shown in FIG. 1 are denoted by the same reference numerals. The detail description for those portions is omitted.

The gear device 27 is designed similarly to the gear device 8 shown in FIG. 1 in that two gears, i.e., a ring gear 4 and a planetary gear 5, are disposed between an input shaft 2 and an output shaft 3 which are coaxially arranged, thereby performing a speed reduction of one step. However, similarly to a related gear device 1 (FIG. 8), the gear device 27 is provided with an eccentric portion 2*a* on the input shaft 2 so that the planetary gear 5 is axis-supported by the eccentric portion.

The planetary gear 5 is provided with a cavity portion 28, and a weight portion 29 for recovering the balance of the planetary gear 5 is provided within the cavity portion 28. The weight portion 29 is fixed to the eccentric portion 2*a* of the input shaft 2 such that the eccentric motion of the center of gravity of the weight portion 29 is in the phase opposite to the eccentric motion of the center of gravity of the planetary gear 5. The weight portion 29 is rotated within the cavity portion 28 along with the input shaft 2. The weight portion 29 is fixed to the eccentric portion 2*a* so as to be located at the center in the thickness direction of the planetary gear 5. The shape of the weight portion 29 is not limited to an oval shape as illustrated, and may be selected from a fan shape, a circular shape or any other suitable shapes.

With this structure, the center of gravity of the planetary gear 5 and that of the weight portion 29 are in the positions where they are constantly in balance, and therefore, it is possible to secure the axial dynamic balance of the planetary gear 5 which is the rotating element of the gear device 27. In other words, since the balance of the planetary gear 5 which is axis-supported by the eccentric portion 2*a* of the input shaft 2 and which makes the eccentric motion can be recovered within the planetary gear, it is possible to secure the axial dynamic balance of the planetary gear 5; thereby, the axial dynamic balance is secured for the entire gear device 27.

Accordingly, it is also possible to provide a gear device which can improve the dynamic balance in a so-called S-P-C type planetary gear mechanism, and suppress the generation of the vibrations under various use conditions with the gear device 27 shown in FIG. 6. Therefore, even if the gear device 27 is used in place of the gear device 8 in the electrically driven actuators 16 and 24 of the present invention (the electrically driven actuators in which the threaded shaft 18 does not penetrate the gear device 8), a low-vibration and precise actuator can be provided.

The present invention thus constructed provides the following effects. With the electrically driven actuator according to the first aspect of the present invention, it is possible to provide an electrically driven actuator equipped with a gear device which can improve a dynamic balance in a so-called S-P-C type planetary gear mechanism, and to suppress the generation of the vibrations under various use conditions.

According to the second aspect of the present invention, it is possible to secure the dynamic balance of every individual rotating element in a gear device of an electrically driven actuator, and thus to provide an electrically driven actuator of which vibration is lessened. Furthermore, it is possible to avoid the complication in structure of the gear device, and to provide an electrically driven actuator equipped with the precise gear device at a low cost.

With the electrically driven actuator according to the third aspect of the present invention, it is possible to secure the dynamic balance of every individual rotating element with simple structure. With the electrically driven actuator according to the fourth aspect of the present invention, the steps of processing for obtaining the gear device can be reduced. With the electrically driven actuator according to the fifth aspect of the present invention, it is possible to attain more ideal balance, and thus to provide an electrically driven actuator equipped with a high-precision and less-vibration gear device.

With the electrically driven actuator according to the sixth aspect of the present invention, it is possible to provide an electrically driven actuator having a gear device in which the lightweight, high rigidity, easy-to-process, low cost, etc. are facilitated depending on the object.

With the electrically driven actuator according to the seventh or eighth aspect of the present invention, the dynamic balance of every individual rotating element can be attained, and it is possible to provide an electrically driven actuator having a gear device of which vibration is lessened.

With the electrically driven actuator according to the ninth aspect of the present invention, it is also possible to perform an operation bypassing the electrically driven actuator as required.

What is claimed is:

1. An electrically driven actuator characterized by a gear device which performs a speed reduction of one step by means of two gears disposed between coaxially arranged input and output shafts, and which secures an axial dynamic balance in every individual rotating element in the electrically driven actuator which transmits the output of a motor through the gear device to a threaded shaft, and which generates a linear motion in a member engaged with the threaded shaft, the rotating elements including:

(a) a disk which has a circular recess arranged to be eccentric with respect to the input shaft and which is fixed to the input shaft;

(b) a ring gear which is rotatably supported by the circular recess and whose rotating motion is restricted to an eccentric motion within the circular recess when the disk rotates; and (c) a planetary gear which is coaxially fixed to the output shaft and engaged with the ring gear;
wherein a weight portion is formed in the disk to recover an axial dynamic balance which is lost due to the circular recess and the ring gear.

2. The electrically driven actuator according to claim 1, wherein the weight portion comprises thickness-reduced portions which have the same depth as the recess and which are formed in an unrecessed portion of the disk.

3. The electrically driven actuator according to claim 2, wherein the thickness-reduced portions comprise a plurality of circular holes having the same diameter.

4. The electrically driven actuator according to claim 1, wherein the rotating elements include a planetary gear which is axis-supported on an eccentric portion provided on the input shaft and which is engaged with a fixed ring gear to make a rotating motion and a revolving motion, and wherein the planetary gear is provided with a cavity portion whose inside is provided with a weight portion for recovering the balance of the planetary gear.

5. The electrically driven actuator according to claim 4, wherein the weight portion is fixed to the eccentric portion of the input shaft such that an eccentric motion of the center of gravity of the weight portion keeps counter-phase to an eccentric motion of the center of gravity of the planetary gear.

6. The electrically driven actuator according to claim 1, characterized by having a means of releasing the restriction on a rotating motion of the ring gear towards a casing.

7. The electrically driven actuator according to claim 1, characterized by having a means of releasing the restriction on a rotating motion of the ring gear towards a casing.

8. The electrically driven actuator according to claim 2, characterized by having a means of releasing the restriction on a rotating motion of the ring gear towards a casing.

9. The electrically driven actuator according to claim 3, characterized by having a means of releasing the restriction on a rotating motion of the ring gear towards a casing.

10. The electrically driven actuator according to claim 4, characterized by having a means of releasing the restriction on a rotating motion of the ring gear towards a casing.

11. The electrically driven actuator according to claim 5, characterized by having a means of releasing the restriction on a rotating motion of the ring gear towards a casing.

* * * * *